United States Patent [19]

Sylvester et al.

[11] 4,242,232
[45] Dec. 30, 1980

[54] CATALYST AND ITS PREPARATION AND USE FOR THE SOLUTION POLYMERIZATION OF CONJUGATED DIENES

[75] Inventors: Gerd Sylvester, Leverkusen; Josef Witte; Günter Marwede, both of Cologne, all of Fed. Rep. of Germany

[73] Assignee: Bayer Aktiengesellschaft, Fed. Rep. of Germany

[21] Appl. No.: 54,632

[22] Filed: Jul. 3, 1979

[30] Foreign Application Priority Data

Jul. 8, 1978 [DE] Fed. Rep. of Germany ....... 2830080

[51] Int. Cl.$^3$ .............................................. C08F 4/12
[52] U.S. Cl. ........................... 252/429 C; 252/429 B; 252/431 C; 526/137; 526/151; 526/153; 526/157; 526/164
[58] Field of Search ............ 252/429 C, 431 C, 429 B

[56] References Cited

U.S. PATENT DOCUMENTS

| | | | |
|---|---|---|---|
| 3,118,864 | 1/1964 | Maxwell et al. ............ | 252/429 A X |
| 3,676,411 | 7/1972 | Throckmorton et al. ... | 252/431 C X |
| 4,152,295 | 5/1979 | Stapp ............................. | 252/431 X |

Primary Examiner—Patrick Garvin
Attorney, Agent, or Firm—Connolly and Hutz

[57] ABSTRACT

A catalyst comprising
(a) a reaction mixture formed by reacting $M(RCO_2)_3$ with $AlR_3^{,1}$
(b) $AlR_3^2$ and / or $HAlR_2^2$ and
(c) a Lewis acid wherein M denotes a trivalent rare earth element with an atomic number of 57 to 71, R denotes a saturated or unsaturated, straight chain or branched chain aliphatic hydrocarbon group having 1 to 20 C-atoms which may be substituted one or more times with cycloalkyl having 5 to 7-atoms and/or phenyl, the carboxyl group being attached to a primary, secondary or tertiary C-atom; a cycloalkyl group having 5 to 7 ring carbon atoms, which may be substituted one or more times with alkyl groups having from 1 to 5 C-atoms; or an aromatic group having from 6 to 10 ring carbon atoms, which may be substituted one or more times with alkyl groups having 1 to 5 C-atoms, and $R^1$ and $R^2$ are identical or different, straight chain or branched chain alkyl groups having from 1 to 10 C-atoms. Said catalyst may be used for polymerizing diene monomers in solution. Its production takes place by mixing the components in any order.

13 Claims, No Drawings

CATALYST AND ITS PREPARATION AND USE FOR THE SOLUTION POLYMERIZATION OF CONJUGATED DIENES

This invention relates to a novel catalyst, a certain process for preparing it, and its use for the polymerization of conjugated dienes, especially butadiene, in solution to produce polymers which have good tackiness.

Polybutadiene containing a high proportion of cis 1,4-units has been produced on a large industrial scale for some time and used for the manufacture of tires and other rubber products. The organo-metallic mixed catalysts used for its production contain transition metal components in the form of titanium, cobalt or nickel compounds. Among its various disadvantages compared with natural rubber, polybutadiene prepared with these catalysts has inferior tackiness.

Although catalysts are known for the production of a polybutadiene which has improved tackiness, they have other serious disadvantages which have prevented their technical application.

Thus, in a publication which appeared in "Kautschuk und Gummi, Kunststoffe", 22, No. 6/1969, page 293 et seq, for example, there is described a catalyst with which it is possible to produce a polybutadiene which has good tackiness. The catalyst system described there consists of 1. an aluminium alkyl or alkyl aluminium hydride
2. cerium octoate, and
3. a halide compound.

The cerium compound used has the disadvantage of being very sparingly soluble in the solvents used for the preparation of the catalyst and polymerisation of butadiene. The completed catalyst also fails to form a homogeneous solution. It is therefore difficult to meter out accurate quantities of the cerium compound and the catalyst in a technical process, but this would be very important for a uniform progress of the reaction and consistent quality of the end products. In addition, heterogeneous catalysts used in the solution polymerisation of dienes have a strong tendency to form gels which are liable to encrust the reaction vessels and stirrers and block up pipes so that a production process in an industrial installation would be seriously affected.

In the aforesaid publication, it is mentioned on page 297, column 2, line 3, that other rare earth metals probably also form catalysts with similar properties.

The use of rare earth compounds as components of organo-metallic mixed catalysts for polymerisation reactions has in fact been known for a long time. Thus, for example, U.S. Pat. No. 3,118,864, among others, describes a catalyst for the polymerization of butadiene, isoprene or chloroprene which is formed by the reaction of an ester or halide of cerium with an organo-metallic compound which has at least one metal-carbon bond.

Another catalyst suitable for the stereospecific polymerisation of dienes is described in German Auslegeschrift No. 1,302,264. It consists of:

(a) a chelate halide of a metal of Groups IIIB of the Periodic System of Elements, and
(b) an aluminium trialkyl or alkyl aluminium hydride.

The said patent specification also mentions catalysts which are prepared from (a) a soluble chelate of a metal of Group IIIB,
(b) an alkyl aluminium halide, and
(c) an aluminium trialkyl or alkyl aluminium hydride.

All the catalysts described there also have the disadvantages mentioned above, i.e. they are solid substances which will not dissolve either in the monomers or in those solvents which are suitable for the polymerisation of dienes.

It is therefore pointed out in the said publication (column 7, lines 16–20) that the polymer produced by polymerisation in organic solvents is obtained "in a swollen, agglomerated state".

Products of this type do not have satisfactory rubber technological properties so that, when these catalysts are used, it is preferred to carry out polymerisation in the absence of a solvent. However, for a process carried out on a large technical scale, it is desirable to use an inert solvent so that the heat liberated in the polymerisation process can be more easily removed.

It is, therefore, an object of the present invention to provide a catalyst for the polymerization of conjugated dienes, especially butadiene, by means of which it is possible to produce a polymer which has satisfactory rubber technological properties, in particular good tackiness.

Another problem to be solved by the invention is that all the catalyst components added to the polymerisation solution must be soluble in an inert solvent.

Yet another object of this invention is that the catalyst used should be highly active even in small quantities for the polymerisation of dienes.

It has now been found that catalysts for the polymerisation of dienes, which do not have the disadvantages described above, are obtained when catalysts consisting of the following known components:

(a) a carboxylic acid salt of the rare earths $M(RCO_2)_3$,
(b) an aluminium trialkyl $AlR_3$, and
(c) a Lewis acid are prepared by a particular method.

The carboxylates of rare earth metals are only very sparingly soluble in hydrocarbons. In part, they form highly viscous, swollen masses even in high dilutions, so that accurate dosing is impossible. It has now been found that these compounds can be converted into products which are soluble in hydrocarbons by reacting them with small quantities of trialkyl aluminium.

This finding is surprising since other compounds of the rare earths, e.g. 8-hydroxyquinolinates, which have been proposed as catalyst components in German Auslegeschrift No. 1,302,264, cannot be dissolved even with large quantities of aluminium alkyl.

The mixed catalyst according to this invention thus consists of (A) the reaction mixture obtained from the reaction of a carboxylic of rare earths, $M(RCO_2)_3$, with an aluminium trialkyl, $AlR^1_3$,
(B) an aluminium alkyl $AlR^2_3$ and/or alkylaluminium hydride $HAlR^2_2$ and
(C) a Lewis acid.

In component A, the symbol M denotes a trivalent rare earth element with an atomic number of 57 to 71 in the Periodic System. It is preferred to use those compounds in which M is lanthanum, cerium, praseodymium or neodymium, or a mixture of rare earth elements containing at least 10% by weight of a least one of the elements lanthanum, cerium, praseodymium or neodymium.

Compounds in which M is lanthanum or neodymium or a mixture of rare earths containing 30% by weight of lanthanum or neodymium are particularly preferred.

The symbol R in the formula M (RCO$_2$)$_3$ denotes a saturated or unsaturated, straight chain or branched chain, aliphatic hydrocarbon group having from 1 to 20 C-atoms, optionally substituted one or more times, for example 1 to 5 times, with a cycloalkyl having 5 to 7 C-atoms and/or phenyl, the carboxyl group being bound to a primary, secondary or tertiary C-atom; or a cycloalkyl group which has 5 to 7 ring carbon atoms and may be substituted one or more times, for example 2 to 4 times, with alkyl groups having 1 to 5 C-atoms; or an aromatic group which has 6 to 10 ring carbon atoms and may be substituted one or more times preferably 1–4 times with alkyl groups having 1 to 5 C-atoms.

The following carboxylic acids are mentioned as examples of acids from which the carboxyl group RCO$_2$ may be derived: acetic acid, propionic acid, n-butyric acid, iso-butyric acid, valeric acid, pivalic acid, hexane carboxylic acid-1, hexane carboxylic acid-2, methyl diethyl acetic acid, heptane carboxylic acid-1, heptane carboxylic acid-3, 2-methylhexane carboxylic acid-2, triethyl acetic acid, octane carboxylic acid-1, 2-ethyl hexanoic acid, nonane carboxylic acid-1, lauric acid, myristic acid, palmitic acid, stearic acid, oleic acid, benzoic acid, phenylacetic acid, triphenylacetic acid and tricyclohexyl acetic acid.

The carboxyl group RCO$_2$ may also be derived from commercial acid mixtures.

The following are examples of suitable carboxylates of rare earths:
lanthanum propionate, lanthanum diethylacetate, lanthanum 2-ethyl hexanoate, lanthanum stearate, lanthanum benzoate, cerium benzoate, praseodymium propionate, praseodymium cyclohexane carboxylate, praseodymium 2-ethyl hexanoate, neodymium diethyl acetate, neodymium 2-ethyl hexanoate, neodymium cyclohexane carboxylate, neodymium stearate, neodymium oleate and neodymium benzoate.

In the formula AlR$^1_3$ of the aluminium alkyl used for the preparation of component A, the symbol R$^1$ denotes a straight chain or branched chain alkyl group having 1 to 10 C-atoms. The following are examples of suitable aluminium alkyls:
trimethyl aluminium,
triethyl aluminium,
tri-n-propyl aluminium,
triisopropyl aluminium,
tri-n-butyl aluminium,
triisobutyl aluminium,
tripentyl aluminium,
trihexyl aluminium,
tricyclohexyl aluminium and
trioctyl aluminium.

Triethyl aluminium and triisobutyl aluminium are preferred. Triethyl aluminium is particularly preferred.

The aluminium alkyl, AlR$^2_3$, used as component B may be identical to or different from the aluminium alkyl used for the preparation of catalyst component A. All the compounds AlR$^1_3$ mentioned in that connection are suitable. Therefore R$^2$ denotes the same as R$^1$ also in case of HAlR$^2_2$. Triethyl aluminium and triisobutyl aluminium are preferred.

So-called Lewis acids are used as component C, for example organometallic halides in which the metal atom belongs to the main group 3(a) or 4(a) of the Periodic System as well as halides of the elements of main groups 3(a), 4(a) and 5(a) of the Periodic System as represented in "Handbook of Chemistry and Physics", 45th Edition 1964–65:

methyl aluminium dibromide,
methyl aluminium dichloride,
ethyl aluminium dibromide,
ethyl aluminium dichloride,
butyl aluminium dibromide,
butyl aluminium dichloride,
dimethyl aluminium bromide,
dimethyl aluminium chloride,
diethyl aluminium bromide,
diethyl aluminium chloride,
dibutyl aluminium bromide,
dibutyl aluminium chloride,
methyl aluminium sesquibromide,
methyl aluminium sesquichloride,
ethyl aluminium sesquibromide,
ethyl aluminium sesquichloride,
dibutyl tin dichloride,
aluminium tribromide,
antimony trichloride,
antimony pentachloride,
phosphorus trichloride,
phosphorus pentachloride and
tin tetrachloride.

The following are preferred: diethyl aluminium chloride, ethyl aluminium sesquichloride, ethyl aluminium dichloride, diethyl aluminium bromide, ethyl aluminium sesquibromide and ethyl aluminium dibromide.

The catalyst component A may be prepared by making a slurry of the compound M(RCO$_2$)$_3$ in an inert solvent and then adding the aluminium trialkyl. Aliphatic, cycloaliphatic and aromatic solvents are suitable for this purpose, for example the following: pentane, hexane, heptane, cyclohexane, benzene, and toluene. The quantity of aluminium trialkyl added may vary within wide limits. The molar ratio of AlR$^1_3$ to M(RCO$_2$)$_3$ is preferably in the range of from 0.5:1 to 50:1, most preferably from 1:1 to 25:1. A molar ratio of AlR$^1_3$:M(RCO$_2$)$_3$ in the range of from 1:1 to 5:1 is generally sufficient to obtain a catalyst in which the advantageous properties are in no way reduced.

The temperature at which the reaction to form catalyst component A is carried out may also vary within a wide range and is most preferably in the range of from $-30°$ to $+50°$ C., in particular from $0°$ to $40°$ C. It is generally limited by the melting point or boiling point of the solvent. The solubility improves as the temperature rises, as is to be expected.

For a given compound M(RCO$_2$)$_3$, the time required to form the catalyst component A depends on the nature and quantity of the solvent used, the nature and quantity of the aluminium alkyl and the temperature. Exact figures therefore cannot be given but it will be seen from the Examples that solution generally takes place within a short time.

The properties of the catalyst are influenced by the proportion of the sum of all aluminium alkyl compounds, AlR$^1_3$, AlR$^2_3$ and HAlR$^2_2$ to the quantity of M(RCO$_2$)$_3$, since a larger quantity can be used for the preparation of component A than is necessary to form the soluble reaction mixture A.

The molar ratio in which the catalyst components are used may vary within wide limits. The molar ratio of M(RCO$_2$)$_3$ to the sum of AlR$^1_3$, AlR$^2_3$ and HAlR$^2_2$ is in the range of from 1:2 to 1:100, preferably from 1:10 to 1:80 and most preferably from 1:10 to 1:60. The molar ratio of component A, based on the quantity of M(RCO$_2$)$_3$ used, to component C is in the range of from 1:0.4 to 1:15, preferably from 1:0.5 to 1:10.

To prepare the catalyst, the solution of components A, B and C are mixed in any desired sequence in a suitable inert solvent with stirring. The same solvent as that used for the polymerisation of the diene may be used for preparation of the catalyst. The temperature at which preparation of the catalyst is carried out may vary within a wide range and is generally limited by the melting point and boiling point of the solvent used. Temperatures ranging from $-30°$ to $3080°$ C., for example, are suitable. Preparation of the catalyst may be carried out separately or, preferably, by the addition and mixing of catalyst component A, B and C with the polymerisation reaction mixture. If desired, components A and B or components B and C may be mixed together before they are added to the polymerisation mixture. It is immaterial whether the diene which is to be polymerised is added before or after the catalyst components or whether the diene is added between the addition of one and the other catalyst component. The following are examples of suitable sequences in which the components for preparation of the catalyst may be added to the polymerisation mixture:

1. solvent
2. diene,
3. component A,
4. component B,
5. component C; or 1. solvent,
2. component B,
3. diene,
4. component A,
5. component C; or 1. solvent,
2. component B,
3. component C,
4. component A,
5. diene.

Catalyst components A, B and C may also be added simultaneously to the solvent-monomer mixture.

The catalyst is highly active and very small quantities are therefore sufficient to produce a catalytic effect. For 100 g of monomer, from 0.01 to 3 mMol, preferably from 0.01 to 0.5 mMol, of catalyst, based on the compound $M(RCO_2)_3$ used for the preparation of component A, are generally used.

The polymerisation of the diene is carried out in organic solvents which must be inert towards the catalyst system used. Suitable solvents include e.g. aromatic, aliphatic and cycloaliphatic hydrocarbons such as benzene toluene. pentane. n-hexane, iso-hexane, heptane and cyclohexane.

Polymerization with the catalyst according to the invention may be carried out either continuously or batch-wise.

It is carried out at a temperature in the range of from $0°$ to $120°$ C., preferably from $40°$ to $100°$ C.

As conjugated dienes butadiene, isoprene, pentadiene-1.3 and 2.3-dimethylbutadiene, preferably butadiene are mentioned.

In one common method of carrying out the process, components A, B and C are added to a mixture of 100 parts by weight of solvent and 5 to 40 parts by weight, preferably 0 to 30 parts by weight of butadiene. Polymerization starts at once, as can be recognized from the evolution of heat. When 0.06 mMol of catalyst is used, based on the quantity of compound $M(RCO_2)_3$ used for the preparation of component A, and a temperature of about $90°$ C. is employed, conversion rates of more than 90% are obtained after reaction times ranging from 30 minutes to 5 hours.

When the desired degree of conversion has been reached, the catalyst is inactivated by the addition of small quantities of, for example, water, carboxylic acids or alcohols.

The usual stabilizers are added to the polymer solution in the usual quantities before the polymer is worked up. The stabilizers used may include, for example, sterically hindered phenols or aromatic amines such as 2,6-di-tert.-butyl-4-methyl phenol.

The polymer is isolated by concentration of the polymer solution by evaporation, precipitation with a non-solvent such as methanol, ethanol or acetone or, preferably steam distillation of the solvent. Drying is carried out by the usual methods, e.g. in a drying cupboard or screw drier.

The polybutadiene prepared according to the invention contains, for example, from 80 to 99% of cis-1,4 double bonds. Its tackiness is substantially improved compared with that of known trade products. Preferred fields of application are in the manufacture of motor car tires and technical rubber articles.

The invention is described in more detail with the aid of the following Examples, in which the precentages are by weight.

EXAMPLE 1

9.8 ml of cyclohexane were added to 0.3 mMol of neodymium octanoate, Nd $(C_7H_{15}CO_2)_3$, and the mixture was stirred for 1½ hours at room temperature. The substance swelled up without going into solution during this time. 0.2 ml of a cyclohexane solution containing 1.5 mMol of triethyl aluminium were then added. A clear solution was obtained in one minute.

EXAMPLE 2

9.3 ml of cyclohexane were added to 1 mMol of $Nd(C_7H_{15}CO_2)_3$ and the mixture was stirred for 90 minutes at $23°$ C. The substance did not dissolve during this time.

0.7 ml of a cyclohexane solution containing 5 mMol of $Al(C_2H_5)_3$ were then added. The whole solid was dissolved within 15 minutes.

EXAMPLES 3 to 6

9.6 ml of cyclohexane were added to, in each case, 0.5 mMol of didymium tris-(diethyl acetate), didymium cyclohexane carboxylate, didymium naphthenate and didymium oleate. The term "didymium" stands for a mixture of rare earth elements having the composition: 72% of neodymium, 20% of lanthanum and 8% of praseodymium. The mixtures were stirred for 1 hour at $25°$ C. None of the didymium compounds went into solution.

0.4 ml of a cyclohexane solution containing 2.5 mMol of $Al(C_2H_5)_3$ where then added to each mixture. All the substances were completely dissolved after 15 minutes.

EXAMPLE 7

Polymerisation was carried out in a stirrer vessel which had been flushed with nitrogen. A 12% solution of butadiene in cyclohexane was first introduced.

0.1 mMol of $Di(C_7H_{15}CO_2)_3.15\ Al(C_2H_5)_3$ (reaction product of didymium tris-2-ethyl-hexanoate and 15 times the molar quantity of triethyl aluminium), based on 100 g of monomer, was then added. Didymium (Di) stands for a mixture of the rare earth elements having the composition: 72% of neodymium, 20% of lanthanum and 8% of praseodymium. The reaction product was used as a 0.04 molar solution in cyclohexane. 3.0 mMol of triethyl aluminium and 0.08 mMol of aluminium tribromide, based in each case on 100 g of butadiene, were then added to the polymerisation mixture as solutions in cyclohexane. The reaction vessel was surrounded by a jacket through which water could be conducted at a temperature in the range of from 20° to 90° C. The polymerisation temperature was thereby maintained at 56° C.

The reaction was stopped after 5 hours by the addition of ethanol. After the addition of 0.3% of 2,6-Ditert.-butyl-4-methyl phenol (based on solid polymer) as stabilizer, the polybutadiene was obtained by removal of the cyclohexane by steam distillation.

The polymer was dried in a vacuum at 50° C. The yield was 95%, based on the monomer put into the process.

I.R. Analysis: 1,4-cis=95.0 %; 1,4-trans=4.4%; 1,2=0.6%.

The polymer had the following properties:

Intrinsic viscosity: 3.60 dl/g, gel content lower than 1%.

Mooney viscosity (ML-4', 100° C.): 46.
Defo hardness (80° C.): 300 p.
Defo elasticity (80° C.): 11%.

The polymer was mixed in a rolling mill and then vulcanized. The mixture and the vulcanisate were tested and compared with a commercial type of polybutadiene obtained with the aid of a titanium catalyst. The following formulation was used for the mixture:

polybutadiene: 100 parts by weight
carbon black (N 330): 50 parts by weight
aromatic oil: 5 parts by weight
ZnO: 3 parts by weight
stearic acid: 1.5 parts by weight
N-isopropyl-N'-phenyl-p-phenylenediamine: 1.0 part by weight
phenyl-α-napthylamine: 1.0 parts by weight
napthenic oil: 4.0 parts by weight
benzothiazyl-2-sulphene morpholide: 1.0 part by weight
sulphur: 1.5 parts by weight.

When the mixture was prepared on rollers, the trade product which was used for comparison showed distinct defects in its ability to be processed, particularly at temperatures above 40° C.

The polybutadiene prepared according to the invention, on the other hand, had excellent processing characteristics even at temperatures up to 70° C. A smooth sheet having neither holes nor tears was immediately obtained by rolling. This sheet remained smooth and intact during and after addition of the components of the mixture and it did not lift off the roller.

In contrast to the known trade products, polybutadiene produced with the aid of the catalyst according to the invention is distinguished by its excellent tackiness.

We claim:

1. A catalyst comprising
   (A) a reaction mixture formed by reacting a rare earth carboxylate, $M(RCO_2)_3$, with an aluminum trialkyl, $AlR^1_3$,
   (B) an aluminum trialkyl, $AlR^2_3$, and/or an alkylaluminumhydride and
   (C) a Lewis acid selected from the group consisting of an organometallic halide whose metal is of main group 3a and 4a of the Periodic System and a halide of an element of main group 3a, 4a and 5a of the Periodic System, wherein
   M denotes a trivalent rare earth element with an atomic number of 57 to 71,
   R denotes a saturated or unsaturated, straight chain or branched chain aliphatic hydrocarbon group having 1 to 20 C-atoms which may be substituted one or more times with cycloalkyl having 5 to 7 C-atoms and/or phenyl, the carboxyl group being attached to a primary, secondary or tertiary C-atom; a cycloalkyl group having 5 to 7 ring carbon atoms, which may be substituted one or more times with alkyl groups having from 1 to 5 C-atoms; or an aromatic group having from 6 to 10 ring carbon atoms, which may be substituted one or more times with alkyl groups hav 1 to 5 C-atoms, and
   $R^1$ and $R^2$ are identical or different, straight chain or branched chain alkyl groups having from 1 to 10 C-atoms.

2. A catalyst according to claim 1, characterised in that M stands for lanthanum, cerium, praseodymium or neodymium.

3. A catalyst according to claim 1, characterised in that M is a mixture of rare earth elements with atomic numbers from 57 to 71.

4. A catalyst according to claim 1, characterised in that M is a mixture of rare earth elements containing at least 10% by weight of at least one of the elements, lanthanum, cerium, praseodymium or neodymium.

5. A catalyst according to claim 1, characterised in that M is a mixture of elements of the rare earths containing at least 30% by weight of lanthanum or neodymium.

6. A catalyst according to claim 1, characterised in that $R^1$ is ethyl or isobutyl.

7. A catalyst according to claim 1, characterised in that $R^2$ is ethyl or isobutyl.

8. A catalyst according to claim 1, characterised in that, for preparation of component A, the compounds $M(RCO_2)_3$ and $AlR^1_3$ are used in a hydrocarbon in a molar ratio within the range of from 1:0.5 to 1:50.

9. A catalyst according to claim 1, characterised in that the molar ratio of $M(RCO_2)_3$ to the sum of $AlR^1_3$, $AlR^2_3$ and $HAlR^2_2$ is in the range of from 1:2 to 1:100.

10. A catalyst according to claim 1, characterised in that components A and C are used in a molar ratio of C:A, based on the quantity of $M(RCO_2)_3$ used, in the range of from 0.4:1 to 15:1.

11. A process for the preparation of a catalyst according to claim 1, characterised in that
   (a) a reaction mixture formed by reacting a rare earth carboxylate, $M(RCO_2)_3$, with an aluminum trialkyl, $AlR^1_3$,
   (b) an aluminum trialkyl, $AlR^2_3$ and/or an alkylaluminumhydride $HAlR^2_2$ and
   (c) a Lewis acid selected from the group consisting of an organometallic halide whose metal is of main group 3a or 4a of the Periodic System and halide of an element of main group 3a, 4a or 5a of the Periodic System are mixed in any sequence in an inert organic solvent at temperatures of from −30° C. to 80° C.

12. A process according to claim 11, characterised in that components A and B or B and C are mixed together before their reaction with component C or A.

13. A process according to claim 11, characterised in that components B and C are mixed together before their reaction with component A.

* * * * *